United States Patent
Zhou

(10) Patent No.: US 11,683,330 B2
(45) Date of Patent: Jun. 20, 2023

(54) NETWORK ANOMALY DATA DETECTION METHOD AND DEVICE AS WELL AS COMPUTER EQUIPMENT AND STORAGE MEDIUM

(71) Applicant: PING AN TECHNOLOGY (SHENZHEN) CO., LTD., Guangdong (CN)

(72) Inventor: Shenglong Zhou, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 599 days.

(21) Appl. No.: 16/960,031

(22) PCT Filed: May 28, 2018

(86) PCT No.: PCT/CN2018/088709
§ 371 (c)(1),
(2) Date: Jul. 3, 2020

(87) PCT Pub. No.: WO2019/134334
PCT Pub. Date: Jul. 11, 2019

(65) Prior Publication Data
US 2021/0067533 A1 Mar. 4, 2021

(30) Foreign Application Priority Data
Jan. 4, 2018 (CN) .......... 201810008923.X

(51) Int. Cl.
*H04L 9/40* (2022.01)
*G06F 16/903* (2019.01)
(Continued)

(52) U.S. Cl.
CPC .... *H04L 63/1425* (2013.01); *G06F 16/90344* (2019.01); *G06F 40/289* (2020.01); *H04L 67/146* (2013.01); *H04L 67/01* (2022.05)

(58) Field of Classification Search
CPC .............. H04L 63/1425; H04L 67/146; H04L 63/1416; H04L 63/1408; H04L 63/10;
(Continued)

(56) References Cited

U.S. PATENT DOCUMENTS 10,291,647 B2 * 5/2019 Lospinuso .......... H04L 63/0428
10,587,647 B1 * 3/2020 Khalid ................ H04L 63/1416
(Continued)

FOREIGN PATENT DOCUMENTS

| | | |
|---|---|---|
| CN | 107302547 A | 10/2017 |
| CN | 107508844 A | 12/2017 |

OTHER PUBLICATIONS

Ates et al., "A New Network Anomaly Detection Method Based on Header Information Using Greedy Algorithm," 2019 6th International Conference on Control, Decision and Information Technologies (CoDIT) Year: 2019 | Conference Paper | Publisher: IEEE.*
Hareesh et al., "Anomaly detection system based on analysis of packet header and payload histograms," 2011 International Conference on Recent Trends in Information Technology (ICRTIT) Year: 2011 | Conference Paper | Publisher: IEEE.*

*Primary Examiner* — Roderick Tolentino

(57) ABSTRACT

A network anomaly data detection method includes the following steps: receiving access request data transmitted by a client; searching historical access request data corresponding to a user session identifier in the access request data; acquiring a header character string of the access request data; performing word segmentation processing on the header character string according to a preset step length so as to obtain a word segmentation set; obtaining a word segmentation weight matrix according to the historical access request data and the word segmentation set; inputting the word segmentation weight matrix into an anomaly data
(Continued)

Client

Network connection

Server detection model so as to obtain a data anomaly probability; and judging whether anomaly data exists in the header character string according to the data anomaly probability.

18 Claims, 4 Drawing Sheets

(51) Int. Cl.
*H04L 67/146* (2022.01)
*G06F 40/289* (2020.01)
*H04L 67/01* (2022.01)

(58) Field of Classification Search
CPC ............ G06F 16/90344; G06F 40/289; G06F 16/313; H04W 12/08
See application file for complete search history.

(56) References Cited

U.S. PATENT DOCUMENTS

| | | | |
|---|---|---|---|
| 10,708,281 B1* | 7/2020 | Modalavalasa | H04L 63/1416 |
| 10,715,539 B1* | 7/2020 | Weldon | H04L 67/02 |
| 10,757,118 B2* | 8/2020 | Mittig | H04L 63/1416 |
| 11,138,463 B1* | 10/2021 | Wang | G06N 5/047 |
| 2014/0150101 A1* | 5/2014 | Chiu | H04L 63/1425 |
| | | | 726/22 |
| 2014/0373148 A1* | 12/2014 | Nelms | H04L 63/1441 |
| | | | 726/23 |
| 2019/0182269 A1* | 6/2019 | Lee | G06F 21/561 |
| 2019/0289007 A1* | 9/2019 | Zhang | H04L 63/08 |

* cited by examiner

NETWORK ANOMALY DATA DETECTION METHOD AND DEVICE AS WELL AS COMPUTER EQUIPMENT AND STORAGE MEDIUM

CLAIM OF PRIORITY

This application is based on the priority to China Patent Application No. 201810008923.X, filed Jan. 4, 2018 and entitled "Network Anomaly Data Detection Method and Device as well as Computer Equipment and Storage Medium", which is hereby incorporated by reference in its entirety.

TECHNICAL FIELD

This application relates to a network anomaly data detection method and device as well as a computer equipment and a storage medium.

BACKGROUND

The rapid development of Internet brings great convenience to people's life and also brings a new challenge to network security. Websites are inevitably subjected to malicious intrusion or attach, and people's property and information security is under threat. A current network security problem has attracted great attentions of people. Most of current website attack threat analysis and detection methods and systems are based on network log analysis. Log data is converted into structural data to store, and character match is performed based on a specific rule. However, the foregoing detection method is low in processing efficiency and easily enables an attacker to find a matching rule, thereby causing failed report or missing report of network attack.

SUMMARY

According to various embodiments disclosed in the present application, a network anomaly data detection method and device as well as a computer equipment and a storage medium are provided.

A network anomaly data detection method includes the following steps:
 receiving access request data transmitted by a client;
 searching historical access request data corresponding to a user session identifier in the access request data;
 acquiring a header character string of the access request data;
 performing word segmentation processing on the header character string according to a preset step length so as to obtain a word segmentation set;
 obtaining a word segmentation weight matrix according to the historical access request data and the word segmentation set;
 inputting the word segmentation weight matrix into an anomaly data detection model so as to obtain a data anomaly probability; and
 judging whether anomaly data exists in the header character string according to the data anomaly probability.

A network anomaly data detection device includes:
 a request receiving module, used for receiving access request data transmitted by a client;
 a historical data searching module, used for searching historical access request data corresponding to a user session identifier in the access request data;
 a character string acquiring module, used for acquiring a header character string of the access request data;
 a word segmentation module, used for performing word segmentation processing on the header character string according to a preset step length so as to obtain a word segmentation set;
 a weight obtaining module, used for obtaining a word segmentation weight matrix according to the historical access request data and the word segmentation set;
 a probability obtaining module, used for inputting the word segmentation weight matrix into a pre-trained anomaly data detection model so as to obtain a data anomaly probability; and
 an anomaly judging module, used for judging whether anomaly data exists in the header character string according to the data anomaly probability.

The computer equipment includes a memory and one or more processors, wherein computer readable instructions are stored in the memory; and steps of the network anomaly data detection method provided in any embodiment of the present application are realized when the computer readable instructions are executed by the processors.

This application further provides one or more nonvolatile computer readable instruction storage media stored with the computer readable instructions. When the computer readable instructions are executed by one or more processors, the steps of the network anomaly data detection method provided in any embodiment of the present application are realized by the one or more processors.

Details of one or more embodiments of the present application are provided in drawings and descriptions below. Other features and advantages of the present application become obvious from the specification, drawings and claims.

BRIEF DESCRIPTION OF THE ACCOMPANYING DRAWINGS

To clearly describe technical solutions in embodiments of the present application, drawings needing to be used in the embodiments will be simply described below. Apparently, the drawings described below are merely part of the embodiments of the present application. All other drawings may be obtained by those ordinary skilled in the art according to the drawings without contributing creative labor.

DETAILED DESCRIPTION OF ILLUSTRATED EMBODIMENTS

In order to make technical solutions and advantages of the present application more clear, the present application is further described in detail below in combination with drawings and embodiments. It will be appreciated that the specific embodiments described herein are merely illustrative of the present invention and are not intended to limit the present invention.

Figure 1:
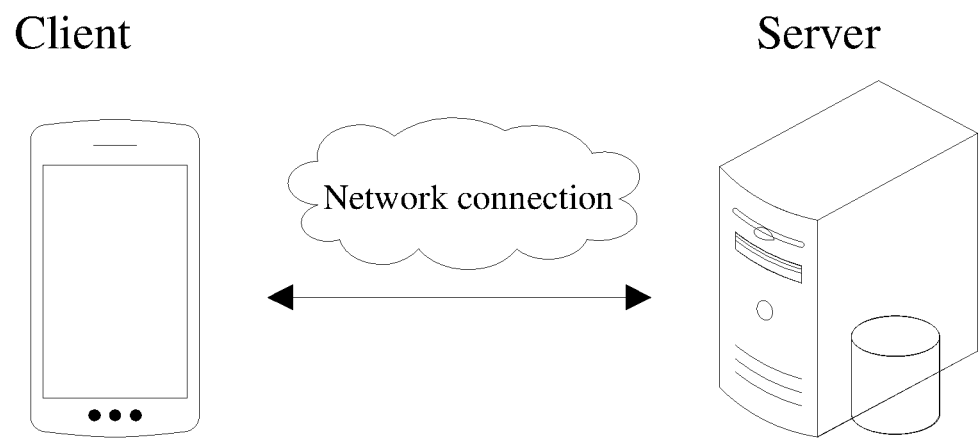
FIG. 1 is an application environment diagram of a network anomaly data detection method in accordance with one or more embodiments.

A network anomaly data detection method provided in the present application may be applied to an application environment as shown in FIG. 1. A server communicates with a client through a network. The client initiates a network access request to the server, and the server receives access request data transmitted by the client and searches corresponding historical access request data of a user according to a user session identifier in the received access request data. The server performs word segmentation processing on a header character string in the access request data according to a preset step length and calculates a word segmentation weight matrix, and the word segmentation weight matrix is input into an anomaly data detection model so as to obtain a data anomaly probability. Whether network anomaly data exists in the access request data transmitted by the client according to the data anomaly probability. Thus, network anomaly data detection accuracy can be increased, and failed report or missing report of network attack may be avoided. A terminal 102 may be but not limited to various personal computers, laptops, smartphones, tablet personal computers and portable wearable devices. The server may be realized by a standalone server or a server cluster composed of multiple servers.

Figure 2:
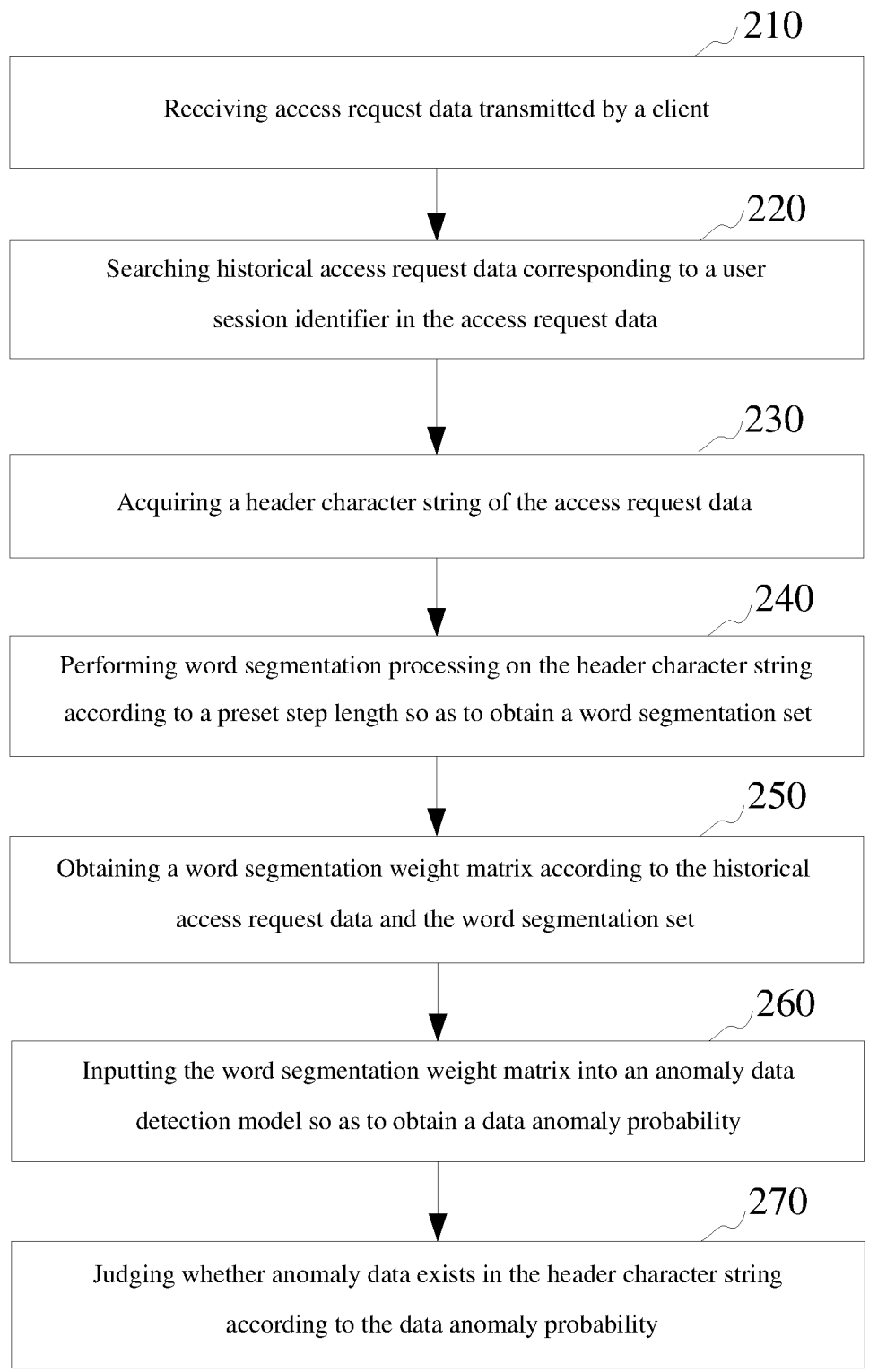
FIG. 2 is a method flow chart of a network anomaly data detection method in accordance with one or more embodiments.

In one embodiment, as shown in FIG. 2, a network anomaly data detection method is provided. The method is applied to the server in FIG. 1 for description. The method includes the following steps:

Step 210: receiving access request data transmitted by a client;

when the user browses web pages at the client, the client initiates a network access request to the server according to a web page access address of the user and transmits access request data to the server. The access request data may include request method protocol data, request header character strings, request body data and the like. The server receives the access request data transmitted by the client;

Step 220: searching historical access request data corresponding to a user session identifier in the access request data;

the client carries the user session identifier while transmitting the access request data to the server. The user session identifier is used for performing unique identification on a network session of the user initiated by the client, wherein the network session may include multiple network requests. The client does not carry the user session identifier while initiating a first network access request of the network session to the server, and the server receives the first network access request to generate a request session identifier and returns the request session identifier carried and generated during data response to the client, wherein the request session identifier is used for unique identification of the network session. After the client receives the request session identifier, the user session identifier is carried during the next network access request according to the request session identifier, client information and the user session identifier generated by the user information. In addition to the request session identifier, the user identifier further includes feature identifiers of the user and a used client thereof. After receiving the access request data transmitted by the client, the server performs associated recording on the access request data and the user session identifier carried in the request;

after receiving the access request data transmitted by the client, the server reads the user session identifier in the access request data, and searches historical access request data of a historical network access request of the present network session associated with the user session identifier;

Step 230: acquiring a header character string of the access request data;

the server extracts the header character string from the received access request data. In some embodiments, the header character string may be the requested URL. In other embodiments, the header character string may also include more request header information;

Step 240: performing word segmentation processing on the header character string according to a preset step length so as to obtain a word segmentation set;

the server sets a word segmentation step length in advance. For example, the preset step length may be 3 characters, 5 characters and the like. A specific preset step length may be set according to practical experience. The server segments the extracted header character string into multiple segmented words in sequence according to a preset segmentation sequence in accordance with the preset step length. The preset segmentation sequence may be a sequence from right to left, and may also be a sequence from left to right, or any other sequence.

For example, the header character string is 'chapter17/user.html', the preset step length refers to 4 four-character strings, and the header character string is segmented into 5 segmented words such as '/cha', 'pter', '17/u', 'ser.' and 'html' according to the sequence from the left to right. If a number of characters of the last segmented word is smaller than the preset step length, a space character may be filled at the end of the last segmented word to enable the number of characters to be equal to the preset step length.

In some embodiment, before the header character string is subjected to word segmentation, common characters in the header character string are preprocessed, the common characters therein are removed, and the preprocessed header character string is subjected to word segmentation again. For example, the common characters may be characters such as 'html' and 'htm'. The server acquires a common character table, extracts the common characters from the common character table and judges whether the common characters exist in the header character string. If so, the corresponding common characters are removed from the header character string. In some embodiments, while performing search matching on the common characters, matching should be performed according to a sorting order of the common characters in the common character table. E.g., in the common character table, the sorting order of the character 'html' is higher than that of the character 'htm'. Then, the 'html' is searched first. If the character 'html' cannot be found in the header character string, the character 'htm' is searched. Therefore, rationality and effectiveness of removing the common characters can be increased.

The server obtains a word segmentation set after obtaining the segmented words. The word segmentation set may be in the form of a word segmentation matrix or in other forms;

Step 250: obtaining a word segmentation weight matrix according to the historical access request data and the word segmentation set;

after obtaining the word segmentation set, the server calculates a word frequency of each segmented word occurring in the header character string, calculates a frequency of each segmented word occurring in all the historical access request data, obtains a word weight of each segmented word according to the two frequencies obtained by foregoing calculation, and generates the word segmentation weight matrix.

In some embodiments, before the frequency of each segmented word occurring in all the historical access request data is calculated, a respective header character string is extracted from the historical access request data. Only the frequency of each segmented word occurring in the header character string of each historical access request data is calculated. Further, if preprocessing is performed before word segmentation is performed on the header character string of the present access request data, the header character string of the historical access request data is also preprocessed, and the occurring frequency of each segmented word is calculated after the common characters are removed.

Step 260: inputting the word segmentation weight matrix into an anomaly data detection model so as to obtain a data anomaly probability;

the server inputs the word segmentation weight matrix into the anomaly data detection model so as to obtain data anomaly probability of the access request data; and the anomaly data detection model is obtained by inputting known sample data into an initial anomaly data detection model for performing model training and model parameter optimization.

Step 270: judging whether anomaly data exists in the header character string according to the data anomaly probability;

the server acquires a preset probability threshold, compares the calculated data anomaly probability with the preset probability threshold, and judges a comparison result according to a preset judgment rule. For example, the preset probability threshold is set as 0.5; when the data anomaly probability is greater than or equal to 0.5, it is judged that anomaly data exists in the header character string; and when the data anomaly probability is smaller than 0.5, the anomaly data does not exist in the header character string. It should be indicated that, the preset probability threshold and the preset judgment rule are set according to specific anomaly data detection models, not limited to foregoing examples. In some embodiments, when the server judges that the anomaly data exists in the access request data, network access request anomaly alarm is generated and prompt is performed. When the server judges that the anomaly data does not exist in the access request data, the access request data received at this time is subjected to associated storage with the user session identifier, thereby facilitating subsequent searching of the access request data of the session.

In the present embodiment, the server stores a pre-trained anomaly data detection model. After the access request is received, historical access request data of the session belonging to the present access request is searched, the header character string in the access request is subjected to word segmentation processing so as to obtain a word segmentation weight matrix, the matrix is input into the anomaly data detection model so as to obtain data anomaly probability, and whether network attack exists in the request is judged according to the data anomaly probability; and therefore, the access request can be subjected to user behavior analysis according to the access request data of the session belonging to the access request and by utilizing the anomaly data detection model, a network attack behavior and a normal access behavior can be effectively identified, anomaly data detection accuracy is increased, and failed report or missing report probability of network attack is decreased.

In some embodiments, after the step 210 of receiving the access request data transmitted by the client, the method further includes the following steps: reading a user session identifier in the access request data; comparing a user fingerprint identifier in the user session identifier with a user fingerprint identifier of last received access request data when the user session identifier includes a request session identifier; generating a new request session identifier when the user fingerprint identifier is inconsistent with the user fingerprint identifier of last received access request data, and transmitting the new request session identifier to the client when response data corresponding to the access request data is returned to the client.

In the present embodiment, the user session identifier includes two parts, that is, the request session identifier and the user fingerprint identifier. The request session identifier is randomly generated by the server during setup of the network session. The request session identifier may be a cookie field and is transmitted to the client in a setcookie manner The user fingerprint identifier is a fingerprint identifier generated by the client according to client feature information. The client feature information may include user account information, the model of a client browser, versions, used languages, fonts, installed plug-in and other information, network environment information such as ip addresses of public and internal networks and the like, and other related information such as client screen resolution and the like. The user fingerprint information may reflect information of an environment where the current client is located. When the used model of the browser, the located network or other client features are changed, the user fingerprint information generated by the client is changed as well.

In some embodiments, the step of generating the user fingerprint identifier by the client includes the following sub-steps: extracting client features by the client; searching feature values corresponding to the various client features; acquiring preset feature weights corresponding to the various client features; and performing calculation according to the feature values corresponding to the various client features and the feature weights so as to obtain the user fingerprint identifier. For example, a fingerprint value may be generated by calculation of a Hash algorithm so as to serve as the user fingerprint identifier. Thus, the user using the client may be subjected to unique identification.

While reading the user session identifier, the server first judges whether the user session identifier includes the request session identifier, and when the server judges that the request session identifier is absent, it shows that the user session identifier is an access request of a new session transmitted by the client. The server randomly generates the request session identifier and sets up a new session, and returns the newly generated request session identifier while returning the response data to the client.

While judging that the user session identifier includes the request session identifier, the server acquires access request data of a last access request of the client corresponding to the request session identifier, and reads the user fingerprint identifier therefrom. The server compares the user fingerprint identifier in the last access request data with the user fingerprint identifier received at this time. When the two user fingerprint identifiers are inconsistent, the server generates a new session identifier and sets up a new session, and transmits the new request session identifier to the client while returning the response data to the client, so that the client carries the new session identifier and the user fingerprint identifier of the client while transmitting the next access request.

While judging that the user fingerprint identifier is inconsistent with the user fingerprint identifier of the last access request data, the server continuously executes a step of searching historical access request data corresponding to the user session identifier in the access request data.

In the present embodiment, the server performs sorted storage on the access request data transmitted by the client according to the user session identifier. The access request data of the session corresponding to the user session identifier can be found according to the user session identifier. The access request data of the last access request of the present session can be found by virtue of the request session identifier. Through comparison of the user fingerprint identifier in the last access request data and the user fingerprint identifier of the present request, whether the environment where the client is located is changed can be judged. When the two fingerprints are inconsistent, it is judged that the client environment is changed, risk of network attack may exist, then continuous network sessions are terminated, a new session identifier is generated, and a new session is set up. Thus, the client environment may be validated by the user fingerprint identifier, and network attack possibility is decreased. In addition, by correspondingly storing the access request data of the client and the user session identifier, corresponding historical access request data may be rapidly tracked when network anomaly data is detected, the network attack behavior is rapidly positioned, and working efficiency is increased.

In some embodiments, after the step 210 of receiving the access request transmitted by the client, the method further includes the following steps: reading a user session identifier in the access request data; comparing a user fingerprint identifier in the user session identifier with a user fingerprint identifier of last received access request data when the user session identifier includes a request session identifier; acquiring a session length of the current session when the user fingerprint identifier is inconsistent with the user fingerprint identifier of last access request; and executing a step of searching historical access request data corresponding to the user session identifier in the access request data when the session length does not exceed a preset session length threshold.

When the server judges that the user fingerprint identifier is inconsistent with the user fingerprint identifier of the last access request and that the current environment where the client is located is not changed, the current session may be continued. The server acquires the session length of the current session. Specifically, the server searches time of a first access request that corresponds to the user session identifier and the current time, and calculates a time interval of the two pieces of time so as to obtain the session length of the current session. The server acquires the preset session length threshold, wherein the preset session length threshold represents maximum duration of a valid session. For example, the preset session length threshold may be 10 minutes, 20 minutes, 1 hour, 1 day and the like. The preset session length threshold may be set according to types of specific access requests.

The server compares the session length of the current session with the preset session length threshold. When the session length does not exceed the preset session length threshold, it shows that the current session is a valid session, and the client can continuously perform accessing. The server continuously executes the step of searching the historical access request data corresponding to the user session identifier in the access request data, and performs network anomaly data detection.

In some embodiments, the method further includes the steps: generating a new request session identifier when the session length exceeds the preset session length threshold; and transmitting the new request session identifier to the client when response data corresponding to the access request data is returned to the client.

When the session length exceeds the preset session length threshold, the server judges that the current session has exceeded valid time, thus the session is a valid session, the server terminates the current session, generates a new request session identifier and sets up a new session. When the response data corresponding to the access request data is returned to the client, the new request session identifier is transmitted to the client, so that the client carries the new request session identifier and the user fingerprint identifier of the client while transmitting the next access request data.

In the present embodiment, by setting the preset session length threshold, the maximum length of one session may be limited so as to ensure validness of the session, thereby avoiding stealing and attacking behaviors of user network information caused by too long session time, and increasing security of network access performed by the user.

In some embodiments, the step of obtaining a word segmentation weight matrix according to the historical access request data and the word segmentation set includes the following sub-steps: calculating a word frequency of each segmented word in the header character string in the word segmentation set; calculating an inverse document frequency of each segmented word in the historical access request data in the word segmentation set; calculating to obtain a word weight of each segmented word according to the calculated word frequency of each segmented word and the inverse document frequency; and generating a word segmentation weight matrix of the word segmentation set according to the word weight of each segmented word.

In the present embodiment, an information retrieval method of the word frequency-inverse document frequency serves as a feature extraction method of the text. The word frequency of each segmented word in the header character string is obtained by dividing the frequency of the segmented word occurring in the header character string by the total number of the segmented words in the header character string. For example, if one segmented word '/ch' occurs for 2 times in the header character string, while the total number of the segmented words in the header character string is 10, the word frequency of the segmented word '/ch' in the header character string is 2/10=0.2. The inverse document frequency is obtained by dividing the total number of header character strings in the historical access request data by the number of the word frequencies occurring in all the header character strings and solving a log. For example, if the segmented word '/ch' occurs for 2 times in the 20 header character strings, the inverse document frequency is log (20/2)=1. The word weight of each segmented word is a product of the word frequency of each segmented word and the inverse document frequency. Referring to the foregoing examples, the word weight of the segmented word '/ch' is 0.2*1=0.2. The server calculates the word weights of all the segmented words in the word segmentation set, and obtains the word segmentation weight matrix of the word segmentation set. In some embodiments, arrangement of rows and columns of the word segmentation weight matrix is set according to an input requirement of the anomaly data detection model, and not specifically limited herein.

The information retrieval method of the word frequency-inverse document frequency adopted in the present embodiment can well measure universal importance of one word. Therefore, with the adoption of the foregoing method, abnormal segmented words can be distinguished on the word segmentation weight, and good data is provided for subsequent anomaly data detection model. It should be indicated that, in other embodiments, any other feature calculation method capable of measuring the universal importance can be adopted for calculating the word segmentation weight of the word segmentation set, and is not limited to the method described in the present embodiment.

In some embodiments, the method further includes the following steps: acquiring expected values of an access request data sample set and each access request data sample in the access request data sample set; calculating a word segmentation weight matrix of each access request data sample; inputting the expected value of each access request data sample and the word segmentation weight matrix into an initial anomaly data detection model for training and obtaining an optimal regression coefficient matrix; and correcting the initial anomaly data detection model according to the optimal regression coefficient matrix so as to obtain an anomaly data detection model.

The anomaly data detection model is pre-stored in the server. The anomaly data detection model is obtained by training the initial anomaly data detection model according to the sample data. In the present embodiment, the initial anomaly data detection model is a logistic regression algorithm model: $h_{\theta_0}(x)=1/1+e^{-\theta_0^T x}$, wherein $h_{\theta_0}(x)$ is data anomaly probability and has a value range of (0, 1); x is a word segmentation weight matrix; and $\theta_0$ is an initial regression coefficient matrix. In other embodiments, the anomaly data detection model may be any other algorithm model, and is not limited to the logistic regression algorithm model.

The server collects normal network access request data samples and abnormal network access request data samples to form access request data samples, and sets expected values of normal network access request data and abnormal network access request data. For example, the expected value of the normal network access request data is set as 0, while the expected value of the abnormal network access request data is set as 1. Moreover, the expected values may also be set as other numerical values, and not limited to the foregoing examples.

The server calculates a word segmentation weight matrix of each collected access request data sample, performs word segmentation processing on a header character string of each access request data sample according to a preset step length so as to obtain a word segmentation set, calculates a word frequency of each segmented word in the header character string in the word segmentation set, calculates an inverse document frequency of each segmented word occurring in all the access data request samples, and calculates the word weight of each segmented word according to the calculated word frequency and inverse document frequency, thereby obtaining the word segmentation weight matrix of the access request data samples. The word segmentation weight matrix of each access request data sample is calculated in accordance with the foregoing method.

The server inputs the set expected value of each access request data sample and the corresponding word segmentation weight matrix into the initial anomaly data detection model for training, continuously optimizes the regression coefficient matrix in the model according to a training result, and finally obtains an optimal regression coefficient matrix $\theta_F$ of the model. The initial anomaly data detection model is corrected according to the optimal regression coefficient matrix $\theta_F$ so as to obtain the anomaly data detection model $h_{\theta_F}(x)=1/1+e^{-\theta_F^T x}$, and the anomaly data detection model is stored so as to perform subsequent network anomaly data detection.

In the present embodiment, by collecting lots of access request data samples to train the initial anomaly data detection model, the regression coefficient matrix can be continuously optimized, and the final detection model is obtained, thereby increasing accuracy of the anomaly data detection model.

It should be understood that, although each step in the flow chart of FIG. 2 is displayed in sequence in accordance with arrow indication, but these steps are not inevitably executed in sequence according to the arrow indication. Unless expressly stated in the present application, execution of these steps has no strict sequence limitation. These steps may be executed in other sequences. Moreover, at least one part of steps in FIG. 2 may include multiple sub-steps or multiple stages. These sub-steps or stages are not inevitably executed at the same time, but executed at different moments. The sub-steps or stages are not inevitably executed in sequence, but executed in turns or alternately with at least one part of other steps or sub-steps or stages of the other steps.

Figure 3:
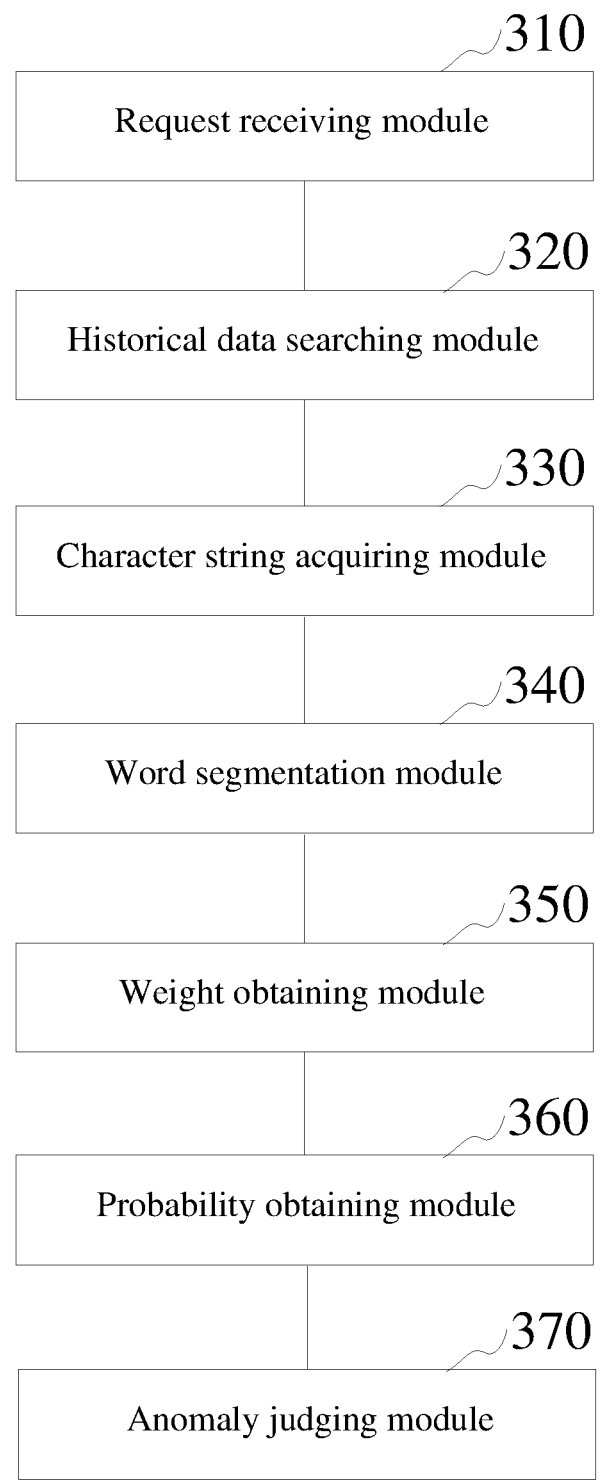
FIG. 3 is a block diagram of a network anomaly data detection device in accordance with one or more embodiments.

In one embodiment, as shown in FIG. 3, a network anomaly data detection device is provided, including: a request receiving module 310, a historical data searching module 320, a character string acquiring module 330, a word segmentation module 340, a weight obtaining module 350, a probability obtaining module 360 and an anomaly judging module 370, wherein:

the request receiving module 310 is used for receiving access request data transmitted by a client;

the historical data searching module 320 is used for searching historical access request data corresponding to a user session identifier in the access request data;

the character string acquiring module 330 is used for acquiring a header character string of the access request data;

the word segmentation module 340 is used for performing word segmentation processing on the header character string according to a preset step length so as to obtain a word segmentation set;

the weight obtaining module 350 is used for obtaining a word segmentation weight matrix according to the historical access request data and the word segmentation set;

the probability obtaining module 360 is used for inputting the word segmentation weight matrix into a pre-trained anomaly data detection model so as to obtain a data anomaly probability; and the anomaly judging module 370 is used for judging whether anomaly data exists in the header character string according to the data anomaly probability.

In some embodiments, the device further includes:

an identifier reading module, used for reading a user session identifier in access request data;

an identifier comparing module, used for comparing a user fingerprint identifier in the user session identifier with a user fingerprint identifier of last received access request data when the user session identifier includes a request session identifier; and an identifier returning module, used for generating a new request session identifier when the user fingerprint identifier is inconsistent with the user fingerprint identifier of the last received access request data, and transmitting the new request session identifier to the client when response data corresponding to the access request data is returned to the client.

In some embodiments, the device further includes:

an identifier reading module, used for reading a user session identifier in access request data;

an identifier comparing module, used for comparing a user fingerprint identifier in the user session identifier with a user fingerprint identifier of last received access request data when the user session identifier includes a request session identifier;

a length acquiring module, used for acquiring a session length of the current session when the user fingerprint identifier is inconsistent with the user fingerprint identifier of the last received access request data; and a length comparing module, used for executing a step of searching historical access request data corresponding to the user session identifier in the access request data when the session length does not exceed a preset session length threshold.

In some embodiments, the device further includes:

an identifier generating module, used for generating a new request session identifier when the session length exceeds the preset session length threshold; and transmitting the new request session identifier to the client when response data corresponding to the access request data is returned to the client.

In some embodiments, the weight obtaining module 350 further includes:

a word frequency calculating module, used for calculating a word frequency of each segmented word in the header character string in the word segmentation set;

a document frequency module, used for calculating an inverse document frequency of each segmented word in historical access request data in the word segmentation set;

a word weight calculating module, used for calculating to obtain a word weight of each segmented word according to the calculated word frequency of each segmented word and the inverse document frequency; and a matrix generating module, used for generating a word segmentation weight matrix of the word segmentation set according to the word weight of each segmented word.

In some embodiments, the device further includes:

an expected value acquiring module, used for acquiring expected values of an access request data sample set and each access request data sample in the access request data sample set;

a matrix calculating module, used for calculating a word segmentation weight matrix of each access request data sample;

a coefficient matrix obtaining module, used for inputting the expected value of each access request data sample and the word segmentation weight matrix into an initial anomaly data detection model for training and obtaining an optimal regression coefficient matrix; and a model correcting module, used for correcting the initial anomaly data detection model according to the optimal regression coefficient matrix so as to obtain an anomaly data detection model.

Specific limitations of the network anomaly data detection device may refer to limitations of the network anomaly data detection method, and unnecessary details are not given any more herein. The various modules in the network anomaly data detection device may be totally or partially realized by virtue of software, hardware and a combination thereof. The foregoing modules may be embedded in or independent of processors in a computer equipment in a form of hardware, and may also be stored in a memory of the computer equipment in a form of software, thereby enabling the processors to call and execute operations corresponding to the various modules.

Figure 4:
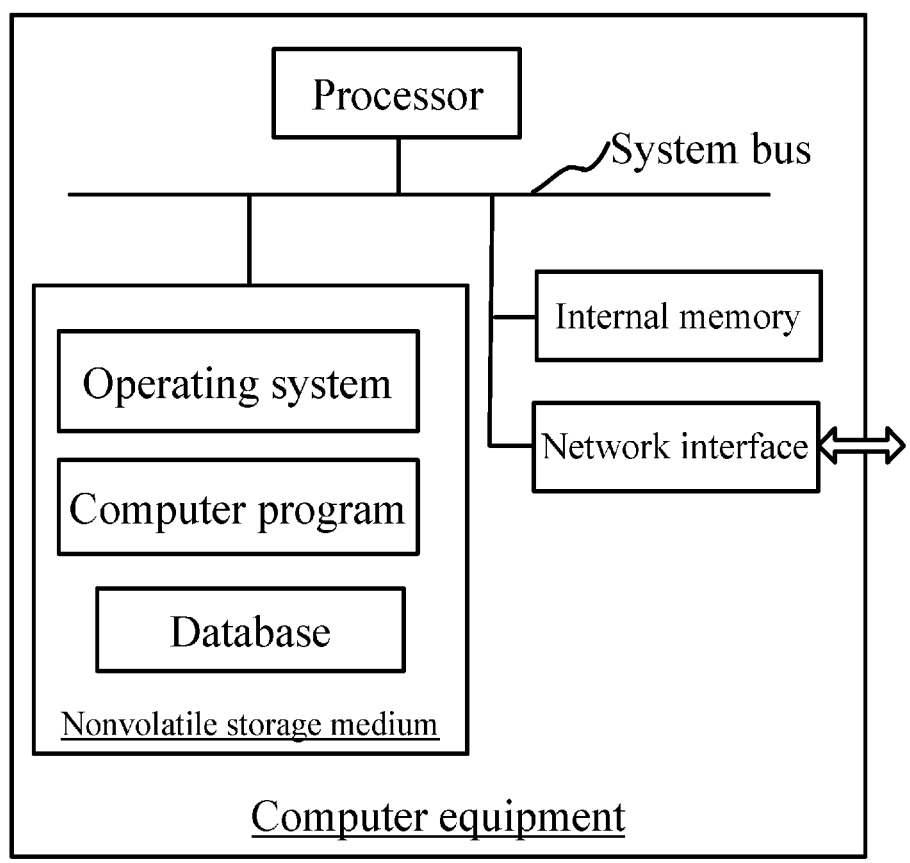
FIG. 4 is a block diagram of a computer equipment in accordance with one or more embodiments.

In some embodiments, a computer equipment is provided. The computer equipment may be a server, and an internal structure diagram of the computer equipment may be as shown in FIG. 4. The computer equipment includes processors connected via system buses, a memory, a network interface and a database. The processors of the computer equipment are used for providing calculation and control capabilities. The memory of the computer equipment includes a nonvolatile storage medium and an internal memory. The nonvolatile storage medium is stored with an operating system, computer readable instructions and a database. The internal memory provides an environment for operations of the operating system in the nonvolatile storage medium and the computer readable instructions. The database of the computer equipment is used for storing access request data, anomaly data detection models and other data. The network interface of the computer equipment is used for communicating with an external terminal through network connection. The network anomaly data detection method is realized when the computer readable instructions are executed by the processors.

Those skilled in the art may understand that, the structure shown in FIG. 4 is merely a block diagram of partial structures related to the solutions in the present application, but not form a limitation of the computer equipment applied to the structure in the solutions of the present application. The specific computer equipment may include components more or less than those as shown in the figure, or a combination of some components, or have different component layouts.

The computer equipment includes a memory and one or more processors, wherein computer readable instructions are stored in the memory; and when the computer readable instructions are executed by the processors, the one or more processors execute the following steps: receiving access request data transmitted by a client; searching historical access request data corresponding to a user session identifier in the access request data; acquiring a header character string of the access request data; performing word segmentation processing on the header character string according to a preset step length so as to obtain a word segmentation set; obtaining a word segmentation weight matrix according to the historical access request data and the word segmentation set; inputting the word segmentation weight matrix into an anomaly data detection model so as to obtain a data anomaly probability; and judging whether anomaly data exists in the header character string according to the data anomaly probability.

In some embodiments, while executing the computer readable instructions, the processors further realize the following steps: reading a user session identifier in the access request data; comparing a user fingerprint identifier in the user session identifier with a user fingerprint identifier of last received access request data when the user session identifier includes a request session identifier; and generating a new request session identifier when the user fingerprint identifier is inconsistent with the user fingerprint identifier of the last received access request data, and transmitting the new request session identifier to the client when response data corresponding to the access request data is returned to the client.

In some embodiments, while executing the computer readable instructions, the processors further realize the following steps: reading a user session identifier in the access request data; comparing a user fingerprint identifier in the user session identifier with a user fingerprint identifier of last received access request data when the user session identifier includes a request session identifier; acquiring a session length of the current session when the user fingerprint identifier is inconsistent with the user fingerprint identifier of last access request; and executing a step of searching historical access request data corresponding to the user session identifier in the access request data when the session length does not exceed a preset session length threshold.

In some embodiments, while executing the computer readable instructions, the processors further realize the following steps: generating a new request session identifier when the session length exceeds the preset session length threshold; and transmitting the new request session identifier to the client when response data corresponding to the access request data is returned to the client.

In some embodiments, while executing the step of obtaining the word segmentation weight matrix according to the historical access request data and the word segmentation set, the processors are further used for realizing the following steps: calculating a word frequency of each segmented word in the header character string in the word segmentation set; calculating an inverse document frequency of each segmented word in the historical access request data in the word segmentation set; calculating to obtain a word weight of each segmented word according to the calculated word frequency of each segmented word and the inverse document frequency; and generating a word segmentation weight matrix of the word segmentation set according to the word weight of each segmented word.

In some embodiments, while executing the computer readable instructions, the processors further realize the following steps: acquiring expected values of an access request data sample set and each access request data sample in the access request data sample set; calculating a word segmentation weight matrix of each access request data sample; inputting the expected value of each access request data sample and the word segmentation weight matrix into an initial anomaly data detection model for training and obtaining an optimal regression coefficient matrix; and correcting the initial anomaly data detection model according to the optimal regression coefficient matrix so as to obtain an anomaly data detection model.

One or more nonvolatile computer readable instruction storage media stored with computer readable instructions are provided. When the computer readable instructions are executed by one or more processors, the one or more processors execute the following steps: receiving access request data transmitted by a client; searching historical access request data corresponding to a user session identifier in the access request data; acquiring a header character string of the access request data; performing word segmentation processing on the header character string according to a preset step length so as to obtain a word segmentation set; obtaining a word segmentation weight matrix according to the historical access request data and the word segmentation set; inputting the word segmentation weight matrix into an anomaly data detection model so as to obtain a data anomaly probability; and judging whether anomaly data exists in the header character string according to the data anomaly probability.

In some embodiments, when the computer readable instructions are executed by the processors, the following steps are further realized: reading a user session identifier in the access request data; comparing a user fingerprint identifier in the user session identifier with a user fingerprint identifier of last received access request data when the user session identifier includes a request session identifier; and generating a new request session identifier when the user fingerprint identifier is inconsistent with the user fingerprint identifier of the last received access request data, and transmitting the new request session identifier to the client when response data corresponding to the access request data is returned to the client.

In some embodiments, when the computer readable instructions are executed by the processors, the following steps are further realized: reading a user session identifier in the access request data; comparing a user fingerprint identifier in the user session identifier with a user fingerprint identifier of last received access request data when the user session identifier includes a request session identifier; acquiring a session length of the current session when the user fingerprint identifier is inconsistent with the user fingerprint identifier of last access request; and executing a step of searching historical access request data corresponding to the user session identifier in the access request data when the session length does not exceed a preset session length threshold.

In some embodiments, when the computer readable instructions are executed by the processors, the following steps are further realized: generating a new request session identifier when the session length exceeds the preset session length threshold; and transmitting the new request session identifier to the client when response data corresponding to the access request data is returned to the client.

In some embodiments, when the computer readable instructions are enabled by the processors to execute the step of obtaining the word segmentation weight matrix according to the historical access request data and the word segmentation set, the processors are further used for realizing the following steps: calculating a word frequency of each segmented word in the header character string in the word segmentation set; calculating an inverse document frequency of each segmented word in the historical access request data in the word segmentation set; calculating to obtain a word weight of each segmented word according to the calculated word frequency of each segmented word and the inverse document frequency; and generating a word segmentation weight matrix of the word segmentation set according to the word weight of each segmented word.

In some embodiments, when the computer readable instructions are executed by the processors, the following steps are further realized: acquiring expected values of an access request data sample set and each access request data sample in the access request data sample set; calculating a word segmentation weight matrix of each access request data sample; inputting the expected value of each access request data sample and the word segmentation weight matrix into an initial anomaly data detection model for training and obtaining an optimal regression coefficient matrix; and correcting the initial anomaly data detection model according to the optimal regression coefficient matrix so as to obtain an anomaly data detection model.

Those ordinary skilled in the art may understand that, implementation of the total or partial processes of the method in the foregoing embodiments may be completed by instructing related hardware by virtue of the computer readable instructions. The computer readable instructions may be stored in a nonvolatile computer readable storage medium. When the computer readable instructions are executed, processes in embodiments of the foregoing methods may be included. Any reference to the memory, storage, databases or other media used in each embodiment provided by the present application may include nonvolatile and/or volatile memories. The nonvolatile memories may include a read-only memory (ROM), a programmable ROM (PROM), an electrically programmable ROM (EPROM), an electrically erasable programmable ROM (EEPROM) or a flash memory. The volatile memory may include a random access memory (RAM) or an external cache memory. As an illustration rather than a limitation, the RAM is available in many forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a memory bus (Rambus) direct RAM (RDRAM), a direct memory bus dynamic RAM (DRDRAM), a memory bus dynamic RAM (RDRAM) and the like.

Various technical features in the foregoing embodiments may be arbitrarily combined. In order to make descriptions brief, not all possible combinations of the various technical features in the foregoing embodiments are described. However, as long as there is no contradiction among the combinations of the technical features, all the combinations should be included in the scope recorded in the present invention.

Only several embodiments of the present application are expressed in the foregoing embodiments. Descriptions are relatively specific and detailed, but cannot be understood as a limitation of claims of the present invention. It should be noted that, modifications and improvements made by those ordinary skilled in the art may be included in the protection scope of the present invention without deviating from the concept of the present application. Therefore, the protection scope of the present application for patent should be based on attached claims.

What is claimed is:

1. A network anomaly data detection method, comprising:
   receiving access request data transmitted by a client;
   searching historical access request data corresponding to a user session identifier in the access request data;
   acquiring a header character string of the access request data;
   performing word segmentation processing on the header character string according to a preset step length so as to obtain a word segmentation set;
   obtaining a word segmentation weight matrix according to the historical access request data and the word segmentation set;
   inputting the word segmentation weight matrix into an anomaly data detection model so as to obtain a data anomaly probability;
   judging whether anomaly data exists in the header character string according to the data anomaly probability; and
   correcting an initial anomaly data detection model in response.

2. The method according to claim 1, after receiving the access request data transmitted by the client, further comprising:
   reading a user session identifier in the access request data;
   comparing a user fingerprint identifier in the user session identifier with a user fingerprint identifier of last received access request data when the user session identifier comprises a request session identifier; and
   generating a new request session identifier when the user fingerprint identifier is inconsistent with the user fingerprint identifier of last received access request data, and transmitting the new request session identifier to the client when response data corresponding to the access request data is returned to the client.

3. The method according to claim 1, after receiving the access request transmitted by the client, further comprising:
   reading a user session identifier in the access request data;
   comparing a user fingerprint identifier in the user session identifier with a user fingerprint identifier of last received access request data when the user session identifier comprises a request session identifier;
   acquiring a session length of the current session when the user fingerprint identifier is inconsistent with the user fingerprint identifier of last access request; and
   executing a step of searching historical access request data corresponding to the user session identifier in the access request data when the session length does not exceed a preset session length threshold.

4. The method according to claim 3, further comprising:
   generating a new request session identifier when the session length exceeds the preset session length threshold; and transmitting the new request session identifier to the client when response data corresponding to the access request data is returned to the client.

5. The method according to claim 1, wherein the obtaining a word segmentation weight matrix according to the historical access request data and the word segmentation set comprises:
   calculating a word frequency of each segmented word in the header character string in the word segmentation set;
   calculating an inverse document frequency of each segmented word in the historical access request data in the word segmentation set;
   calculating to obtain a word weight of each segmented word according to the calculated word frequency of each segmented word and the inverse document frequency; and
   generating a word segmentation weight matrix of the word segmentation set according to the word weight of each segmented word.

6. The method according to claim 1, further comprising:
   acquiring expected values of an access request data sample set and each access request data sample in the access request data sample set;
   calculating a word segmentation weight matrix of each access request data sample;
   inputting the expected value of each access request data sample and the word segmentation weight matrix into the initial anomaly data detection model for training and obtaining an optimal regression coefficient matrix; and
   correcting the initial anomaly data detection model according to the optimal regression coefficient matrix so as to obtain an anomaly data detection model.

7. A computer equipment, comprising a memory and one or more processors, wherein computer readable instructions are stored in the memory; and when the computer readable instructions are executed by the one or more processors, the one or more processors execute the following steps:
   receiving access request data transmitted by a client;
   searching historical access request data corresponding to a user session identifier in the access request data;
   acquiring a header character string of the access request data;
   performing word segmentation processing on the header character string according to a preset step length so as to obtain a word segmentation set;
   obtaining a word segmentation weight matrix according to the historical access request data and the word segmentation set;
   inputting the word segmentation weight matrix into an anomaly data detection model so as to obtain a data anomaly probability;

judging whether anomaly data exists in the header character string according to the data anomaly probability; and correcting an initial anomaly data detection model in response.

8. The computer equipment according to claim 7, wherein while executing the computer readable instructions, the processors further execute the following steps:
reading a user session identifier in the access request data;
comparing a user fingerprint identifier in the user session identifier with a user fingerprint identifier of last received access request data when the user session identifier includes a request session identifier; and
generating a new request session identifier when the user fingerprint identifier is inconsistent with the user fingerprint identifier of the last received access request data, and transmitting the new request session identifier to the client when response data corresponding to the access request data is returned to the client.

9. The computer equipment according to claim 7, wherein while executing the computer readable instructions, the processors further execute the following steps:
reading a user session identifier in the access request data;
comparing a user fingerprint identifier in the user session identifier with a user fingerprint identifier of last received access request data when the user session identifier comprises a request session identifier;
acquiring a session length of the current session when the user fingerprint identifier is inconsistent with the user fingerprint identifier of last access request; and
executing a step of searching historical access request data corresponding to the user session identifier in the access request data when the session length does not exceed a preset session length threshold.

10. The computer equipment according to claim 9, wherein while executing the computer readable instructions, the processors further execute the following steps:
generating a new request session identifier when the session length exceeds the preset session length threshold; and transmitting the new request session identifier to the client when response data corresponding to the access request data is returned to the client.

11. The computer equipment according to claim 7, wherein while executing the computer readable instructions, the processors realize the step of obtaining the word segmentation weight matrix according to the historical access request data and the word segmentation set, further comprising:
calculating a word frequency of each segmented word in the header character string in the word segmentation set;
calculating an inverse document frequency of each segmented word in the historical access request data in the word segmentation set;
calculating to obtain a word weight of each segmented word according to the calculated word frequency of each segmented word and the inverse document frequency; and
generating a word segmentation weight matrix of the word segmentation set according to the word weight of each segmented word.

12. The computer equipment according to claim 7, wherein while executing the computer readable instructions, the processors further execute the following steps:
acquiring expected values of an access request data sample set and each access request data sample in the access request data sample set;
calculating a word segmentation weight matrix of each access request data sample;
inputting the expected value of each access request data sample and the word segmentation weight matrix into the initial anomaly data detection model for training and obtaining an optimal regression coefficient matrix; and
correcting the initial anomaly data detection model according to the optimal regression coefficient matrix so as to obtain an anomaly data detection model.

13. One or more nonvolatile computer readable storage media stored with the computer readable instructions, wherein when the computer readable instructions are executed by one or more processors, the one or more processors execute the following steps:
receiving access request data transmitted by a client;
searching historical access request data corresponding to a user session identifier in the access request data;
acquiring a header character string of the access request data;
performing word segmentation processing on the header character string according to a preset step length so as to obtain a word segmentation set;
obtaining a word segmentation weight matrix according to the historical access request data and the word segmentation set;
inputting the word segmentation weight matrix into an anomaly data detection model so as to obtain a data anomaly probability;
judging whether anomaly data exists in the header character string according to the data anomaly probability; and
correcting an initial anomaly data detection model in response.

14. The storage media according to claim 13, wherein when executed by the processors, the computer readable instructions also execute the following steps:
reading a user session identifier in the access request data;
comparing a user fingerprint identifier in the user session identifier with a user fingerprint identifier of last received access request data when the user session identifier includes a request session identifier; and
generating a new request session identifier when the user fingerprint identifier is inconsistent with the user fingerprint identifier of the last received access request data, and transmitting the new request session identifier to the client when response data corresponding to the access request data is returned to the client.

15. The storage media according to claim 13, wherein when executed by the processors, the computer readable instructions also execute the following steps:
reading a user session identifier in the access request data;
comparing a user fingerprint identifier in the user session identifier with a user fingerprint identifier of last received access request data when the user session identifier comprises a request session identifier;
acquiring a session length of the current session when the user fingerprint identifier is inconsistent with the user fingerprint identifier of last access request; and
executing a step of searching historical access request data corresponding to the user session identifier in the access request data when the session length does not exceed a preset session length threshold.

16. The storage media according to claim 14, wherein when executed by the processors, the computer readable instructions also execute the following steps:

generating a new request session identifier when the session length exceeds the preset session length threshold; and transmitting the new request session identifier to the client when response data corresponding to the access request data is returned to the client.

17. The storage media according to claim 13, wherein while realized by the processors to realize the step of obtaining the word segmentation weight matrix according to the historical access request data and the word segmentation set, the computer readable instructions further comprising:

calculating a word frequency of each segmented word in the header character string in the word segmentation set;

calculating an inverse document frequency of each segmented word in the historical access request data in the word segmentation set;

calculating to obtain a word weight of each segmented word according to the calculated word frequency of each segmented word and the inverse document frequency; and generating a word segmentation weight matrix of the word segmentation set according to the word weight of each segmented word.

18. The storage media according to claim 14, wherein while executed by the processors, the computer readable instructions also execute the following steps:

acquiring expected values of an access request data sample set and each access request data sample in the access request data sample set;

calculating a word segmentation weight matrix of each access request data sample;

inputting the expected value of each access request data sample and the word segmentation weight matrix into the initial anomaly data detection model for training and obtaining an optimal regression coefficient matrix; and correcting the initial anomaly data detection model according to the optimal regression coefficient matrix so as to obtain an anomaly data detection model.

* * * * *